United States Patent
Elgressy et al.

(10) Patent No.: US 6,449,723 B1
(45) Date of Patent: Sep. 10, 2002

(54) METHOD AND SYSTEM FOR PREVENTING THE DOWNLOADING AND EXECUTION OF EXECUTABLE OBJECTS

(75) Inventors: Doron Elgressy, Haifa; Asher Jospe, Natanya, both of (IL)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/183,690

(22) Filed: Oct. 30, 1998

Related U.S. Application Data

(63) Continuation of application No. PCT/IL98/00083, filed on Feb. 23, 1998.

(30) Foreign Application Priority Data

Mar. 10, 1997 (IL) ................................................ 120420

(51) Int. Cl.[7] .......................... G06F 11/30; G06F 15/173
(52) U.S. Cl. ......................... 713/201; 709/224; 709/225
(58) Field of Search ................................ 713/200, 201; 370/389; 709/223, 224, 225, 226, 229, 331, 332; 714/38

(56) References Cited

U.S. PATENT DOCUMENTS

| | | | |
|---|---|---|---|
| 5,414,833 A | | 5/1995 | Hershey et al. ............ 395/575 |
| 5,623,600 A | * | 4/1997 | Ji et al. ...................... 713/201 |
| 5,983,348 A | * | 11/1999 | Ji ................................. 713/200 |
| 6,092,194 A | * | 7/2000 | Touboul ..................... 713/200 |
| 6,098,173 A | * | 8/2000 | Elgressy et al. ............ 713/201 |
| 6,125,390 A | * | 9/2000 | Touboul ..................... 709/223 |
| 6,154,844 A | * | 11/2000 | Touboul et al. ............. 713/201 |
| 6,167,520 A | * | 12/2000 | Touboul ..................... 713/200 |
| 6,321,334 B1 | * | 11/2001 | Jerger et al. ................ 713/200 |
| 6,336,140 B1 | * | 1/2002 | Elgressy et al. ............ 709/224 |
| 6,345,361 B1 | * | 2/2002 | Jerger et al. ................ 713/200 |
| 2001/0049795 A1 | * | 12/2001 | Elgressy et al. ............ 713/200 |

FOREIGN PATENT DOCUMENTS

| | | | | |
|---|---|---|---|---|
| WO | WO 99/16225 | * | 4/1999 | ........... H04L/29/06 |
| WO | WO 99/29082 | * | 6/1999 | ........... H04L/29/06 |

OTHER PUBLICATIONS

Giuri et al, "Role–Based Access Control in Java," May 1998, 3rd ACM Workshop on Role–Based Access, pp. 91–100.*

Kemmerer, Richard, "Security Issues in Distributed Software," 1997, Reliable Software Group, Department of Computer Science University of California, Santa Barbara, pp. 52–59.*

(List continued on next page.)

*Primary Examiner*—Gail Hayes
*Assistant Examiner*—Christopher A. Revak
(74) *Attorney, Agent, or Firm*—Cooper & Dunham LLP

(57) ABSTRACT

A method for selectively preventing the downloading and execution of undesired Executable Objects in a computer includes analyzing a header of a an Executable Object which is detected at a gateway, determining the resources of a computer that the Executable Object needs to utilize and comparing the resources of the computer that the Executable Object needs to utilize with a user's Security Policy representing the resources, or a combination of resources, that the user allows or does not allow an executable object to utilize within its network. The Executable Object is allowed to pass through the gateway and to reach the computer which has initiated its downloading, if the resources of the computer that the Executable Object needs to utilize are included in the list of the resources allowed for use by the Security Policy. The Executable Object is prevented from passing through the gateway, thereby preventing it from reaching the computer which has initiated its downloading, if the resources of the computer that the Executable Object needs to utilize are included in the list of the resources prohibited for use by the Security Policy.

17 Claims, 2 Drawing Sheets

OTHER PUBLICATIONS

"Security–7 Ltd. Announces Innovative Enterprise Internet Security System," Mar. 1997, PR Newswire, Dialog text search.*

Sharon Machlis: "Screening for Applets", Computerworld, vol. 31, No. 6, Feb. 10, 1997, USA, pp. 51–52.

Dean, D. et al.: "Java Security: From Hot Java to Netscape and Beyond", Proceedings of the 1996 IEEE Symposium on Security and Privacy, Oakland, CA, May 6–8, 1996, No. SYMP. 17, IEEE, pp. 190–200.

* cited by examiner

METHOD AND SYSTEM FOR PREVENTING THE DOWNLOADING AND EXECUTION OF EXECUTABLE OBJECTS

CROSS-REFERENCED TO RELATED APPLICATION

This application is a continuation of co-pending application PCT/IL98/00083 filed Feb. 23, 1998 entitled "Method and System for Preventing the Downloading and Execution of Executable Objects".

FIELD OF THE INVENTION

The present invention relates to the security management of computer networks. More particularly, the invention relates to methods and systems for preventing the downloading and execution of undesirable Executable Objects in a workstation of a computer network.

BACKGROUND OF THE INVENTION

The Internet has developed very much both in respect of its contents and of the technology employed, since it began a few years ago. In the early days of the Internet, web sites included text only, and after a while graphics was introduced. As the Internet developed, many compressed standards, such as pictures, voice and video files, were developed and with them programs used to play them (called "players"). Initially, such files were downloaded to the user's workstation only upon his request, and extracted only by the appropriate player, and after a specific order from the user.

When, in the natural course of the development of the World Wide Web the search for a way to show nicer, interactive and animated Web Pages began, Sun Microsystems Inc. developed Java—a language that allows the webmaster to write a program, a list of commands—Network Executables— that will be downloaded to the user workstation without his knowledge, and executed by his browser at his workstation. The executables are used, e.g., to provide photographic animation and other graphics on the screen of the web surfer. Such executables have some ways approaching the user workstation's resources, which lead to a great security problem. Although some levels of security were defined in the Java language, it was very soon that a huge security hole was found in the language.

Since Java was developed, Microsoft developed ActiveX, which is another Network Executable format, also downloaded into the workstation. ActiveX has also security problems of the same kind.

The Internet has been flooded with "Network Executables" which may be downloaded—deliberately or without the knowledge of the users—into workstations within organizations. These codes. generally contain harmless functions. Although usually safe, they may not meet the required security policy of the organization.

Once executed, codes may jam the network, cause considerable irreversible damage to the local database, workstations and servers, or result in unauthorized retrieval of information from the servers/workstations. Such elements may appear on Java applets, ActiveX components, DLLs and other object codes, and their use is increasing at an unparalleled pace. The majority of these small programs are downloaded into the organization unsolicited and uncontrolled. The enterprise has no way of knowing about their existence or execution and there is no system in place for early detection and prevention of the codes from being executed.

The security problem was solved partially by the browser manufactures which allow the user to disable the use of executables. Of course this is not a reasonable solution, since all the electronic commerce and advertising are based on the use of executables. The security problem is much more serious once such an executable can approach the enterprise servers, databases and other workstations.

It is therefore clear that it is highly needed to be able to prevent undesirable Executable Objects from infiltrating the LAN/WAN in which we work and, ultimately, our workstation and server. However, so far the art has failed to provide comprehensive solutions which are safe and quick enough to be practically useful. Systems such as "Firewall" or "Finjan", distributed for use by Internet users, provide only partial solutions and, furthermore, are difficult to install and to update.

SUMMARY OF THE INVENTION

It is an object of the present invention to provide a comprehensive method for selectively preventing the downloading and execution of undesired Executable Objects in a computer, which overcomes the aforesaid drawbacks of prior art systems.

It is another object of the invention to provide such a system which is easy to install and which can be quickly and easily updated.

It is a further object of the invention to provide such a method which can be used with a large number of gateways, LAN's and workstations.

It is yet another object of the invention to provide such a security management system which is independent of the physical infrastructure and network layout.

It is a further object of the invention to provide a system which analyzes the executables "on the fly", and does not hinder the downloading and he operation of harmless executables.

It is yet a further object of the invention to provide a system of the kind described above, which operates as a central security system to which peripheral gateways may be added as needed, to provide a simple, dynamically growing security system.

It is furthermore an object of the invention to provide a central system which permits to define sub-groups of users. each group being subject to a different security policy.

Also encompassed by the invention is a computer system which utilizes the method of the invention.

Other advantages and objects of the invention will become apparent as the description proceeds.

The method for selectively preventing the downloading and execution of undesired Executable Objects in a computer, according to the invention, comprises the steps of:

(a) providing one or more Control Centers, each connected to one or more gateways located between a LAN and an external computer communication network;

(b) providing means coupled to each of said gateways, to detect Executable Objects reaching said gateway, to analyze the header of each of said Executable Objects, and to determine the resources of the computer that the Executable Object needs to utilize;

(c) providing means coupled to each of said gateways, to store a user's Security Policy representing the resources, or combination of resources, that the user allows or does not allow an Executable Object to utilize within its LAN, wherein the Security Policy is received from and/or stored in each of said one or more Control Centers;

(d) when an Executable Object is detected at the gateway:
  1. analyzing the header of said Executable Object;
  2. determining the resources of the computer that the Executable Object needs to utilize;
  3. comparing the resources of the computer that the Executable Object needs to utilize with the Security Policy and;
     (i) if the resources of the computer that the Executable Object needs to utilize are included in the list of the resources allowed for use by the Security Policy, allowing the Executable Object to pass through the gateway and to reach the computer which has initiated its downloading; and
     (ii) if the resources of the computer that the Executable Object needs to utilize are included in the list of the resources prohibited for use by the Security Policy, preventing the Executable Object from passing through the gateway, thereby preventing it from reaching—the computer which has initiated its downloading.

A Control Center (CC) may be a central control unit, e.g., a PC or other computer, which is connected to a plurality of gateways, and which updates the memory means containing relevant date, e.g., the Security Policy. As will be understood from the description to follow, once the CC is updated, e.g., by the addition of an additional limitation to the Security Policy, all gateways are updated at once. The use of the CC to control the operation of the security elements of the gateways obviates the need (which exists in prior art systems) to update each gateway every time that a change in policy is made.

A LAN (Local Area Network) may be (but is not limited to), e.g., a network of computers located in an office or building. The LAN is typically connected to outside communications networks, such as the World Wide Web, or to more limited LANs, e.g., of a client or supplier, through one or more gateways. The larger the organization, the larger the number of gateways employed, in order to keep communications at a reasonable speed.

Generally speaking, a LAN can also be made of a plurality of smaller LANs, located geographically nearby or far apart, but even if small LANs are found within the same organization, the security requirements may vary from one department to the other, and it may be necessary to keep high security levels, including preventing Executables from migrating from-one department to the other, even within the same organization.

The means coupled to each of said gateways, to detect Executable Objects reaching said gateway, to analyze the header of each of said Executable Objects, and to determine the resources of the computer that the Executable Object needs to utilize may be of many different types. Typically, the executable object is "trapped" and analyzed at the gateway by listening on the communication line to the TCP/IP protocol, as well as to the object transfer protocols, such as SMTP, HTTP, FTP, etc. Hooking into the communication line and extracting the contents of the header of the executable object are steps which are understood by the skilled person, and which can be effected by means of conventional programming, and they are therefore not described herein in detail, for the sake of brevity.

Once the header of the Executable Object (EO) has been analyzed, comparing the resources of the computer that the EO needs to utilize with the Security Policy can be easily done, e.g., by comparing them with a look-up table provided to the gateway by the CC, which represents the Security Policy. Comparison can also be carried out against the data stored in the CC, and in such a case specific memory means and comparing means may not be necessary in the gateway. However, speed and performance considerations will often dictate that such operations be carried out at the gateway itself.

The gateway must be installed in each Internet server within the organization. It comprises a small real time database which contains all the relevant operational information for the gateway. The gateway "listens" to the data being transferred between the enterprise and the Internet. It knows when an object is coming into the LAN, it analyzes it and compares it with the Security Policy to decide what action is to be taken.

According to a preferred embodiment of the invention, as stated, if the resources of the computer that the Executable Object needs to utilize are included in the list of the resources allowed for use by the Security Policy, no steps are taken by the system to prevent the Executable Object from passing through the gateway and reaching the computer which has initiated its downloading. However, if the resources of the computer that the Executable Object needs to utilize are included in the list of the resources prohibited for use by the Security Policy, steps will be taken to prevent the Executable Object from passing through the gateway. Such steps may include, e.g., re-routing the executable to a destination outside the gateway, canceling or garbling part of it, so as to make it inoperative, etc.

The invention is not limited to any specific EO. However, according to a preferred embodiment of the invention, the system analyzes EO's including, inter alia, Java Applets, Active-X OCX, Win32 Executables, DLLs, or the like executable objects. However, as will be apparent to the skilled person, EO's are constantly developed, and the invention is by no means intended to be limited to the use with specific EOs, and the actual nature of the EO is not of critical importance.

According to another preferred embodiment of the invention, the method further comprises the steps of:
  (1) when an undesirable Executable Object is detected at a gateway, providing an identifying value therefrom, and notifying all gateways thereof; and
  (2) providing memory means and suitable identity verification means, coupled to each gateway, to identify undesirable Executable Objects already analyzed by another gateway, and from preventing it from passing the gateway.

Notifying the other gateways of the existence of undesirable EO's is important inasmuch as this procedure may save considerable time if the EO reaches another gateway, which then does not need to analyze it in detail, to determine the contents of its header, but may decide not to allow its passage by a simpler and quicker procedure, such as checksum.

When more than one Control Centers are provided, Security Policies can be disseminated from one main Control Center to the remaining Control Centers, and each Control Center, in turn, controls the operation of the gateways connected to it.

According to a preferred embodiment of the invention, each Control Center and each group of gateways is provided with its own individual Security Policy, which may be the same or different from the Security Policy received from the main Control Center. Of course, each subordinate Control Center may add additional limitations to the Security Policy received from the main Control Center, by the addition of resources to the list of those the use of which is not allowed, but according to a preferred embodiment of the invention, it may not remove limitations from the list of limited resources contained in the Security Policy distributed by the main Control Center.

According to a preferred embodiment of the invention, when the system is first installed on the network, the person in charge of security (called hereinafter "CSO"—Chief Security Officer) defines the identity of other Security Officers (SO) who can log-in to the Control Center and make changes in Security Policies. The CSO can define different levels of authority at which the various SOs can operate and make changes to security policies. Other SOs can make changes in the Control Center only if allowed to do so by the CSO, and those changes can affect only clients hierarchically found under their own responsibility. Such changes can only tighten their client's security policy, with respect to the basic Security Policy, but not loosen it.

Also encompassed by the invention is a computer system comprising one or more LANs, each LAN being connected to an outside computer or computer network through one or more gateways, comprising:

(a) one or more Control Centers, each Control Centers being connected to one or more gateways located between a IAN and an external computer communication network;

(b) means coupled to each of said gateways, to detect Executable Objects reaching said gateway, to analyze the header of each of said Executable Objects, and to determine the resources of the computer that the Executable Object needs to utilize;

(c) means coupled to each of said gateways, to store a user's Security Policy representing the resources, or combination of resources, that the user allows or does not allow an Executable Object to utilize within its LAN, wherein the Security Policy is received from and/or stored in each of said one or more Control Centers;

(d) means, provided at, or coupled to, each gateway:
   1. to analyze the header of when an Executable Object which is detected at the gateway;
   2. to determine the resources of the computer that the Executable Object needs to utilize;
   3. to compare the resources of the computer that the Executable Object needs to utilize wit[0088] the Security Policy and;
      (i) means to allow the Executable Object to pass through the gateway and to reach the computer which has initiated its downloading, if the resources of the computer that the Executable Object needs to utilize are included in the list of the resources allowed for use by the Security Policy; and
      (ii) means for preventing the Executable Object from passing through the gateway, thereby preventing it from reaching the computer which has initiated its downloading, if the resources of the computer that the Executable Object needs to utilize are included in the list of the resources prohibited for use by the Security Policy.

The computer system may also comprise, in addition to the means detailed under (d)3 above, also:

(iii) means for alerting the Security Officers that a given type of Executable Object has entered the gateway; and (iv) means for storing information pertaining to a given Executable Object according to the Security Policy.

DETAILED DESCRIPTION OF PREFERRED EMBODIMENTS

Figure 1:
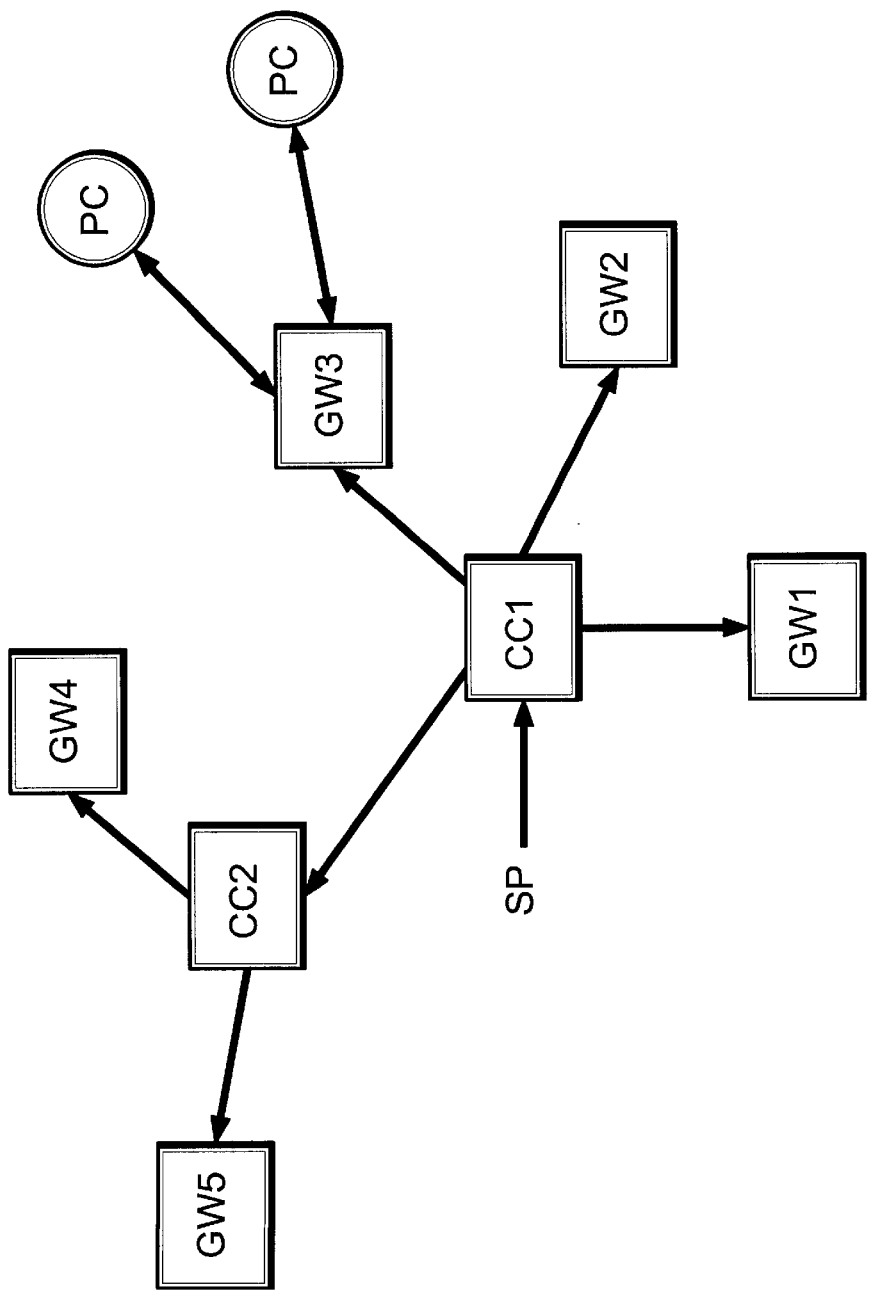
FIG. 1 is a schematic representation of a system according to the invention.

Looking now at FIG. 1, a possible system is schematically shown, which consists of a main Control Center (CC1), and a subordinate Control Center (CC2). Each CC is connected to a plurality of gateways. The main Control Center (CC1) receives data on the Security Policy (SP) from the operator, and immediately proceeds to update the information in gateways GW1 through GW3, and Control Center CC2 which, in turn, updates GW4 and GW5, including any additional limitations which are set in CC2. Each gateway services a plurality of workstations, typically personal computers. Two such workstations, indicated by PC, are shown in FIG. 1 as being connected to GW3, the remaining workstations not being shown, for the sake of simplicity.

Figure 2:
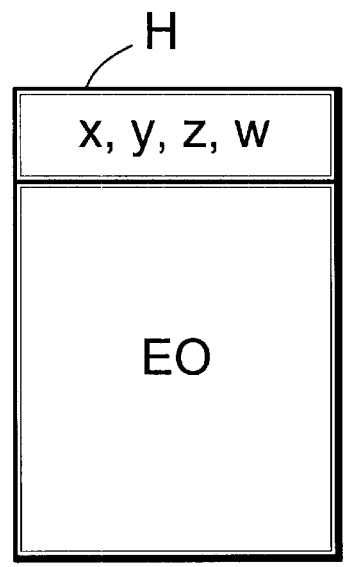
FIG. 2 schematically shows an Executable Object.
Figure 3:
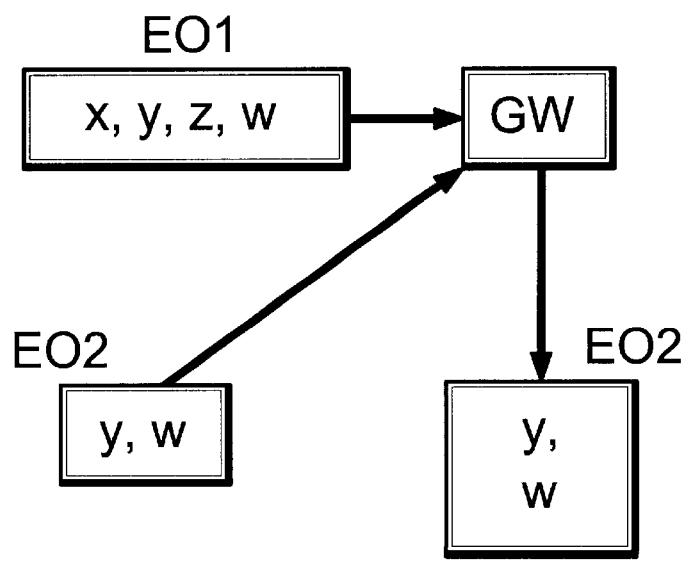
FIG. 3 illustrates the screening function of the gateway operated according to the invention.

FIG. 2 schematically shows an EO (EO1), which has a header from the analysis of which it can be seen that it needs, in order to function, to use resources x, y, z and w. EO1 is shown in FIG. 3, together with an additional EO (EO2) and a gateway GW, as seen in the figure. The gateway detects that EO1 needs to utilize resources x and z, which are prohibited according to the Security Policy. Accordingly, EO1 is not allowed to pass the gateway. On the contrary, EO2, which only needs to utilize resources y and w, which are permitted by the Security Policy, is allowed to proceed and to pass the gateway, toward its destination (viz., the workstation which has asked for it).

When an applet enters the LAN it has to declare which workstation within the organization it has to reach. The allowability of the destination is to be checked, since it is possible that a given applet cannot reach one workstation, with a high security level, but can reach another workstation with a lower security level. Furthermore, the system may change the levels of security on the basis of other considerations, such as the time of the day, the day of the week, etc.

All the above description of preferred embodiments has been provided for the sake of illustration, and is not intended to limit the invention in any way, except as defined by the claims. Many modifications may be effected in the invention. For instance, any number and distribution of Control Centers, Gateways and PCs can be provided, and different Security Policies can be provided by the users. Additionally, a variety of Executable Objects can be monitored, on different infranets and intranets, all without exceeding the scope of the invention.

What is claimed is:

1. A method for selectively preventing the downloading and execution of undesired Executable Objects in a computer, comprising:

(a) providing one or more Control Centers, each connected to one or more gateways located between a LAN and an external computer communication network;

(b) providing means coupled to each of said gateways, to detect Executable Objects reaching said gateway to analyze the header of each of said Executable Objects, and to determine the resources of the computer that the Executable Object needs to utilize;

(c) providing means coupled to each of said gateways, to store a user's Security Policy representing the resources, or combination of resources, that the user allows or does not allow an Executable Object to utilize within its LAN, wherein the Security Policy is received from and/or stored in each of said one or more Control Centers;

(d) when an Executable Object is detected at the gateway:
1. analyzing the header of said Executable Object;
2. determining the resources of the computer that the Executable Object needs to utilize;
3. comparing the resources of the computer that the Executable Object needs to utilize with the Security Policy and;
   (i) if the resources of the computer that the Executable Object needs to utilize are included in the list of the resources allowed for use by the Security Policy, allowing the Executable Object to pass through the gateway and to reach the computer which has initiated its downloading; and
   (ii) if the resources of the computer that the Executable Object needs to utilize are included in the list of the resources prohibited for use by the Security Policy, preventing the Executable Object from passing through the gateway, thereby preventing it from reaching the computer which has initiated its downloading.

2. A method according to claim 1, further comprising, in addition to the means of claim 1(d)3:
(iii) means for alerting the Security Officers that a given type of Executable Object has entered the gateway; and
(iv) means for storing information pertaining to a given Executable Object according to the Security Policy.

3. A method according to claim 2 further comprising the steps of:
(4) when an undesirable executable object is detected at a gateway, providing an identifying value therefrom, and notifying all gateways thereof, and
(5) providing memory means and suitable identity verification means, coupled to each gateway, to identify undesirable executable objects already analyzed by another gateway, and from preventing it from passing the gateway.

4. A method according to claim 1, wherein the Executable Object is selected from Java Applets, Active-X, OCX, Win32 Executables, DLLs, or the like executable objects.

5. A method according to claim 4 further comprising the steps of:
(4) when an undesirable executable object is detected at a gateway, providing an identifying value therefrom, and notifying all gateways thereof, and
(5) providing memory means and suitable identity verification means, coupled to each gateway, to identify undesirable executable objects already analyzed by another gateway, and from preventing it from passing the gateway.

6. A method according to claim 1, further comprising the steps of:
(4) when an undesirable Executable Object is detected at a gateway, providing an identifying value therefrom, and notifying all gateways thereof; and
(5) providing memory means and suitable identity verification means, coupled to each gateway, to identify undesirable Executable Objects already analyzed by another gateway, and from preventing it from passing the gateway.

7. A method according to claim 6, wherein a checksum or the like procedure is carried out on the Executable Object, to generate a substantially unique identification thereof.

8. A method according to claim 1, wherein when more than one Control Centers are provided, Security Policies are disseminated from one main Control Center to the remaining Control Centers, and wherein each Control Center, in turn, controls the operation of the gateways connected to it.

9. A method according to claim 8 wherein each patrol center and each group of gateways is provided with its own individual security policy, which may be the same or different from the security policy received from the main control center.

10. A method according to claim 1, wherein each Control Center and each group of gateways is provided with its own individual Security Policy, which may be the same or different from the Security Policy received from the main Control Center.

11. A method according to claim 10, wherein each subordinate Control Center may add additional limitations to the Security Policy received from the main Control Center, by the addition of resources to the list of those the use of which is not allowed, but it may not remove limitations from the list of limited resources contained in the Security Policy distributed by the main Control Center.

12. A computer system comprising one or more LANs, each LAN being connected to an outside computer or computer network through one or more gateways, comprising:

(a) one or more Control Centers, each Control Centers being connected to one or more gateways located between a LAN and an external computer communication network;
(b) means coupled to each of said gateways, to detect Executable Objects reaching said gateway, to analyze the header of each of said Executable Objects, and to determine the resources of the computer that the Executable Object needs to utilize;
(c) means coupled to each of said gateways, to store a user's Security Policy representing the resources, or combination of resources, that the user allows or does not allow an Executable Object to utilize within its LAN, wherein the Security Policy is received from and/or stored in each of said one or more Control Centers;
(d) means, provided at, or coupled to, each gateway:
1. to analyze the header of when an Executable Object which is detected at the gateway;
2. to determine the resources of the computer that the Executable Object needs to utilize;
3. to compare the resources of the computer that the Executable Object needs to utilize with the Security Policy and;
   (i) means to allow the Executable Object to pass through the gateway and to reach the computer which has initiated its downloading, if the resources of the computer that the Executable Object needs to utilize are included in the list of the resources allowed for use by the Security Policy; and
   (ii) means for preventing the Executable Object from passing through the gateway, thereby preventing it from reaching the computer which has initiated its downloading, if the resources of the computer that the Executable Object needs to utilize are included in the list of the resources prohibited for use by the Security Policy.

13. A computer system according to claim 12, further comprising, in addition to the means of claim 9(d)3:
- (iii) means for alerting the Security Officers that a given type of Executable Object has entered the gateway; and
- (iv) means for storing information pertaining to a given Executable Object according to the Security Policy.

14. A computer recording medium including computer executable code for selectively preventing the downloading and execution of undesired Executable Objects in a computer, said recording medium comprising:
- code for analyzing a header of an Executable Object;
- code for determining resources of the computer that the Executable Object needs to utilize;
- code for comparing the resources of the computer that the Executable Object needs to utilize with a user's Security Policy representing the resources, or a combination of resources, that the user allows or does not allow an executable object to utilize within its network, wherein
  - if the resources of the computer that the Executable Object needs to utilize are included in the list of the resources allowed for use by the Security Policy, allowing the Executable Object to pass through a gateway and to reach the computer which has initiated its downloading, and
  - if the resources of the computer that the Executable Object needs to utilize are included in the list of the resources prohibited for use by the Security Policy, preventing the Executable Object from passing through a gateway, thereby preventing it from reaching the computer which has initiated its downloading.

15. A method for selectively preventing the downloading and execution of undesired Executable Objects in a computer, comprising:
- analyzing a header of a an Executable Object which is detected at a gateway;
- determining the resources of a computer that the Executable Object needs to utilize;
- comparing the resources of the computer that the Executable Object needs to utilize with a user's Security Policy representing the resources, or a combination of resources, that the user allows or does not allow an executable object to utilize within its network, wherein
  - the Executable Object is allowed to pass through the gateway and to reach the computer which has initiated its downloading, if the resources of the computer that the Executable Object needs to utilize are included in the list of the resources allowed for use by the Security Policy, and
  - the Executable Object is prevented from passing through the gateway, thereby preventing it from reaching the computer which has initiated its downloading, if the resources of the computer that the Executable Object needs to utilize are included in the list of the resources prohibited for use by the Security Policy.

16. A computer recording medium including computer executable code for selectively preventing the downloading and execution of undesired Executable Objects in a computer, said recording medium comprising:
- code for analyzing a header of an Executable Object;
- code for determining resources of the computer that the Executable Object needs to utilize;
- code for comparing the resources of the computer that the Executable Object needs to utilize with a user's Security Policy representing the resources, or a combination of resources, that the user allows or does not allow an executable object to utilize within its network, wherein
  - if the resources of the computer that the Executable Object needs to utilize are included in the list of the resources prohibited for use by the Security Policy, preventing the Executable Object from passing through a gateway, thereby preventing it from reaching the computer which has initiated its downloading.

17. A method for selectively preventing the downloading and execution of undesired Executable Objects in a computer, comprising:
- analyzing a header of a an Executable Object which is detected at a gateway;
- determining the resources of a computer that the Executable Object needs to utilize;
- comparing the resources of the computer that the Executable Object needs to utilize with a user's Security Policy representing the resources, or a combination of resources, that the user allows or does not allow an executable object to utilize within its network, wherein
  - the Executable Object is prevented from passing through the gateway, thereby preventing it from reaching the computer which has initiated its downloading, if the resources of the computer that the Executable Object needs to utilize are included in the list of the resources prohibited for use by the Security Policy.

* * * * *